United States Patent
Kim et al.

(10) Patent No.: US 11,571,100 B2
(45) Date of Patent: Feb. 7, 2023

(54) INTELLIGENT ROBOT CLEANER

(71) Applicant: LG Electronics Inc., Seoul (KR)

(72) Inventors: Taehyun Kim, Seoul (KR); Beomoh Kim, Seoul (KR); Jichan Maeng, Seoul (KR); Wonho Shin, Seoul (KR); Jonghoon Chae, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 650 days.

(21) Appl. No.: 16/499,142

(22) PCT Filed: Jun. 28, 2019

(86) PCT No.: PCT/KR2019/007855
§ 371 (c)(1),
(2) Date: Sep. 27, 2019

(87) PCT Pub. No.: WO2020/262737
PCT Pub. Date: Dec. 30, 2020

(65) Prior Publication Data
US 2020/0375425 A1     Dec. 3, 2020

(51) Int. Cl.
*A47L 9/28* (2006.01)
*G06K 9/62* (2022.01)
(Continued)

(52) U.S. Cl.
CPC ............. *A47L 9/281* (2013.01); *A47L 9/2815* (2013.01); *A47L 9/2852* (2013.01);
(Continued)

(58) Field of Classification Search
CPC ...... A47L 9/281; A47L 9/2815; A47L 9/2852; A47L 9/2857; A47L 9/2894;
(Continued)

(56) References Cited

U.S. PATENT DOCUMENTS 9,037,396 B2 * 5/2015 Pack .................. G01C 21/20
                                                  701/409
9,329,598 B2 * 5/2016 Pack .................. G06T 7/73
(Continued)

FOREIGN PATENT DOCUMENTS

JP    2003164401    6/2003
JP    2006141836    6/2006
(Continued)

OTHER PUBLICATIONS

PCT International Application No. PCT/KR2019/007855, International Search Report dated Mar. 30, 2020, 3 pages.

*Primary Examiner* — Bhavesh V Amin
(74) *Attorney, Agent, or Firm* — Lee, Hong, Degerman, Kang & Waimey

(57) ABSTRACT

Disclosed herein is an intelligent robot cleaner. The intelligent robot cleaner primarily senses foreign matter sucked through a suction unit under the control of a control unit, and secondarily senses an article collected in a collection unit, if articles other than the foreign matter are sensed, thus allowing a use to recognize accurate information about the article collected in the collection unit and preventing valuables or small articles from being lost. The intelligent robot device may be associated with an artificial intelligence module, a unmanned aerial vehicle (UAV), a robot, an augmented reality (AR) device, a virtual reality (VR) device, devices related to 5G services, and the like.

14 Claims, 14 Drawing Sheets

(51) Int. Cl.

| | |
|---|---|
| *G10L 25/51* | (2013.01) |
| *H04R 1/08* | (2006.01) |
| *G05D 1/02* | (2020.01) |
| *G01G 19/08* | (2006.01) |
| *G05D 1/12* | (2006.01) |
| *H04N 5/225* | (2006.01) |
| *G06V 10/25* | (2022.01) |
| *G06V 10/56* | (2022.01) |
| *G06V 20/10* | (2022.01) |
| *G01S 17/894* | (2020.01) |
| *G01S 17/931* | (2020.01) |
| *G01S 15/931* | (2020.01) |

(52) U.S. Cl.
CPC ........... *A47L 9/2857* (2013.01); *A47L 9/2894* (2013.01); *G01G 19/08* (2013.01); *G05D 1/0219* (2013.01); *G05D 1/0221* (2013.01); *G05D 1/12* (2013.01); *G06K 9/6217* (2013.01); *G06V 10/25* (2022.01); *G06V 10/56* (2022.01); *G06V 20/10* (2022.01); *G10L 25/51* (2013.01); *H04N 5/2253* (2013.01); *H04R 1/08* (2013.01); *A47L 2201/04* (2013.01); *G01S 15/931* (2013.01); *G01S 17/894* (2020.01); *G01S 17/931* (2020.01); *G05D 1/0231* (2013.01); *G05D 1/0255* (2013.01); *G05D 1/0257* (2013.01); *G05D 2201/0215* (2013.01)

(58) Field of Classification Search
CPC .... A47L 2201/04; G01G 19/08; G01G 19/52; G05D 1/0219; G05D 1/0221; G05D 1/12; G05D 1/0231; G05D 1/0255; G05D 1/0257; G05D 2201/0215; G06K 9/6217; G06K 9/627; G06K 9/6288; G06V 10/25; G06V 10/56; G06V 20/10; G06V 10/82; G10L 25/51; H04N 5/2253; H04N 5/2257; H04R 1/08; H04R 3/00; H04R 2410/00; G01S 15/931; G01S 17/894; G01S 17/931; G01S 7/4808; G01S 17/89

See application file for complete search history.

(56) References Cited

U.S. PATENT DOCUMENTS

| | | | | |
|---|---|---|---|---|
| 10,168,709 B2* | 1/2019 | Kleiner | ............ | G05D 1/0016 |
| 10,247,669 B2* | 4/2019 | Windorfer | ............ | G01N 21/251 |
| 10,349,798 B2* | 7/2019 | Jun | ............ | A47L 9/2826 |
| 10,667,659 B2* | 6/2020 | Jung | ............ | B25J 9/0003 |
| 10,788,836 B2* | 9/2020 | Ebrahimi Afrouzi | ............ | A47L 9/0477 |
| 10,877,484 B2* | 12/2020 | Haegermarck | ............ | A47L 9/0488 |
| 11,154,170 B2* | 10/2021 | Thomas | ............ | G05D 1/0274 |
| 11,224,323 B2* | 1/2022 | Takaoka | ............ | G05D 1/024 |
| 2002/0016649 A1* | 2/2002 | Jones | ............ | G05D 1/0238 700/245 |
| 2003/0025472 A1* | 2/2003 | Jones | ............ | G05D 1/0272 318/568.12 |
| 2003/0030398 A1* | 2/2003 | Jacobs | ............ | G05D 1/0225 318/568.12 |
| 2005/0120505 A1* | 6/2005 | Tani | ............ | G08B 13/19695 15/319 |
| 2005/0166355 A1* | 8/2005 | Tani | ............ | A47L 9/281 15/319 |
| 2006/0074528 A1* | 4/2006 | Uehigashi | ............ | G05D 1/0272 700/258 |
| 2007/0150094 A1* | 6/2007 | Huang | ............ | G05D 1/0274 700/245 |
| 2010/0110280 A1* | 5/2010 | Aoyama | ............ | G05D 1/0246 348/E5.04 |
| 2014/0350839 A1* | 11/2014 | Pack | ............ | G05D 1/0274 901/1 |
| 2015/0120056 A1* | 4/2015 | Noh | ............ | G01S 17/46 901/1 |
| 2015/0212521 A1* | 7/2015 | Pack | ............ | G05D 1/0274 701/28 |
| 2016/0166126 A1* | 6/2016 | Morin | ............ | A47L 7/0004 15/319 |
| 2017/0102710 A1* | 4/2017 | Hu | ............ | A47L 9/30 |
| 2017/0269604 A1* | 9/2017 | Shiromizu | ............ | H04N 7/183 |
| 2017/0273528 A1* | 9/2017 | Watanabe | ............ | A47L 5/22 |
| 2018/0050634 A1* | 2/2018 | White | ............ | G05D 1/0016 |
| 2018/0055312 A1* | 3/2018 | Jung | ............ | G06T 19/006 |
| 2018/0252534 A1* | 9/2018 | Kuhara | ............ | A47L 9/2847 |
| 2018/0361583 A1* | 12/2018 | Williams | ............ | B25J 9/1679 |
| 2018/0361584 A1* | 12/2018 | Williams | ............ | B25J 9/1679 |
| 2019/0025850 A1* | 1/2019 | Park | ............ | G06V 20/58 |
| 2019/0053683 A1* | 2/2019 | Watanabe | ............ | A47L 9/2847 |
| 2019/0086933 A1* | 3/2019 | Munich | ............ | G05D 1/0274 |
| 2019/0204851 A1* | 7/2019 | Afrouzi | ............ | A47L 9/2852 |
| 2020/0022551 A1* | 1/2020 | Watanabe | ............ | A47L 9/2894 |
| 2020/0170468 A1* | 6/2020 | Nakayama | ............ | A47L 9/0477 |
| 2020/0225673 A1* | 7/2020 | Ebrahimi Afrouzi | ............ | G05D 1/0274 |
| 2020/0297180 A1* | 9/2020 | Kang | ............ | G05D 1/0274 |
| 2020/0375425 A1* | 12/2020 | Kim | ............ | H04N 5/2257 |
| 2021/0030225 A1* | 2/2021 | Broz | ............ | H04W 4/38 |
| 2021/0030226 A1* | 2/2021 | Broz | ............ | A47L 9/2826 |

FOREIGN PATENT DOCUMENTS

| | | |
|---|---|---|
| JP | 6154682 | 6/2017 |
| JP | 2018143879 | 9/2018 |
| KR | 101623642 | 5/2016 |

* cited by examiner (a)

(b)

(a)

(b)

(c)

(d)

INTELLIGENT ROBOT CLEANER

CROSS-REFERENCE TO RELATED APPLICATIONS

This application is a National Stage application under 35 U.S.C. § 371 of International Application No. PCT/KR2019/007855, filed on Jun. 28, 2019, the disclosure of which is incorporated by reference in its entirety.

TECHNICAL FIELD

The present disclosure relates to an intelligent robot cleaner and, more particularly, to an intelligent robot cleaner which senses an article sucked together with foreign matter according to an artificial intelligence learning result and allows a user to recognize the sensed article.

BACKGROUND ART

A conventional robot cleaner sucks dust and foreign matter from a floor surface corresponding to a cleaning target region, while moving along a preset travel path. The travel path along which the conventional robot cleaner moves is preset. Since there may be various obstacles on the travel path, people try to find solutions to the problem.

In order to cope with the obstacles, the conventional robot cleaner generally identifies the obstacle that hinders the robot cleaner from moving, and then sets a travel path to bypass the corresponding obstacle.

Furthermore, while the conventional robot cleaner cleans along a predetermined travel path, the cleaner may not identify small articles or valuables as the obstacle and may suck them. Thus, the conventional robot cleaner is problematic in that it continues to operate without recognizing the small articles or valuables as the obstacle and thus the valuables may be lost.

DISCLOSURE

Technical Problem

The present disclosure is intended to solve the above-described problem.

Furthermore, an embodiment of the present disclosure provides an intelligent robot cleaner which is capable of preventing valuables or small articles from being lost by sensing an article sucked during cleaning, analyzing the article and allowing a user to recognize accurate information about the sucked article.

Technical Solution

In this specification, there is provided an intelligent robot cleaner, including a housing; a travel driving unit mounted on the housing, and configured to move on a cleaning target region along a travel path; a suction unit mounted on the housing, and configured to suck foreign matter on the travel path; a collection unit detachably mounted on the housing, and configured to collect the foreign matter sucked through the suction unit while being mounted on the housing; a control unit configured to control the travel driving unit moving along the travel path; and a sensing unit mounted on the housing, and configured to primarily sense the foreign matter sucked through the suction unit under the control of the control unit, and to secondarily sense an article collected in the collection unit, if articles other than the foreign matter are sensed.

The sensing unit may include first to third sensing units disposed around the suction unit or the collection unit.

The intelligent robot cleaner may further include a communication unit configured to exchange a signal with a user's mobile device; and a display unit configured to display a state of the intelligent robot cleaner.

The first sensing unit may be disposed between the suction unit and the collection unit or on an upper portion of the collection unit, and may be configured to sense an image of the foreign matter or the article introduced through the suction unit.

The control unit may extract a color of the article from the image sensed by the first sensing unit by comparative analysis with a preset color distribution.

The control unit may set a region of interest based on the color of the article extracted from the image to remove unnecessary portions.

The control unit may extract characteristics of the article by learning a portion of the article displayed on the region of interest with a neural network, and may acquire information about the article by analyzing the characteristics of the extracted article.

The second sensing unit may be disposed on a lower portion of the collection unit, and may be configured to sense a weight or a pressure of the foreign matter or the article collected in the collection unit.

The control unit may sense that the article may be present in the collection unit when the weight of the collection unit significantly exceeds a preset range, and may transmit a notification message to the user's mobile device registered in the intelligent robot cleaner using the communication unit, or may display the notification message on the display unit.

The third sensing unit may be disposed on a circumferential surface of the collection unit or a lower portion of the collection unit, and may be configured to sense a sound or a noise generated when the article collides with the collection unit by the pressure of the collection unit.

The control unit may sense that the article may be present in the collection unit when the sound generated in the collection unit significantly exceeds a preset range, and may transmit a notification message to the user's mobile device registered in the intelligent robot cleaner using the communication unit, or may display the notification message on the display unit.

The control unit may primarily sense the foreign matter sucked through the suction unit using the first sensing unit, and may secondarily sense the article collected in the collection unit using the second sensing unit or the third sensing unit, if articles other than the foreign matter are sensed.

The control unit may secondarily sense the article collected in the collection unit using the second sensing unit, and then may third sense the article collected in the collection unit using the third sensing unit.

The control unit may learn the primarily sensed article with the neural network, and may secondarily sense the article collected in the collection unit by selecting the second sensing unit or the third sensing unit based on the learned result.

Advantageous Effects

The effects of an intelligent robot cleaner in accordance with the present disclosure will be described as follows.

The present disclosure has an advantage in that it can prevent valuables or small articles from being lost by sensing an article sucked during cleaning, analyzing the article and allowing a user to recognize accurate information about the sucked article.

Furthermore, the present disclosure has an advantage in that it can improve the reliability of a product by sensing an article sucked during cleaning, analyzing the article and allowing a user to recognize accurate information about the sucked article.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
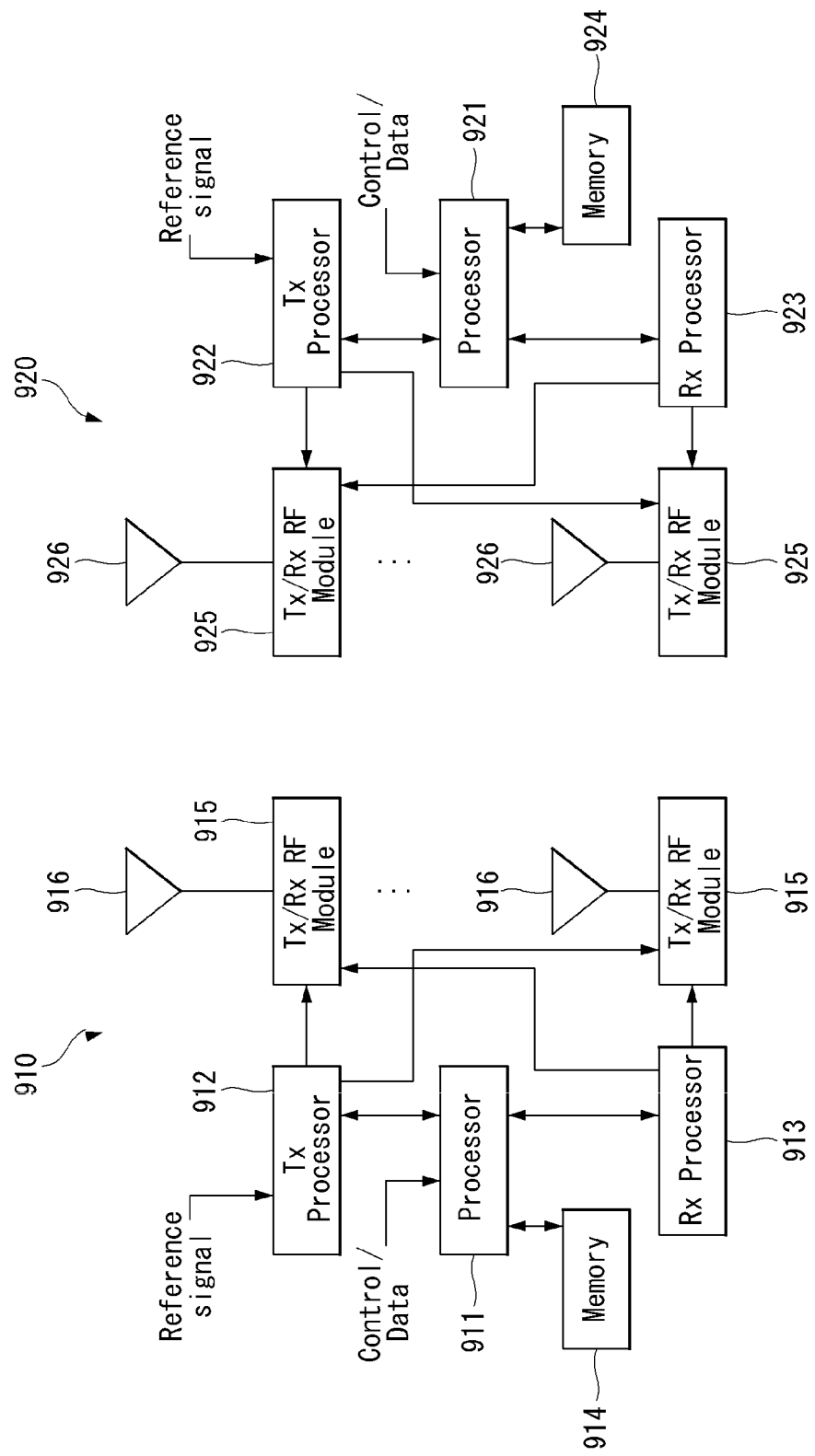
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc.

For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
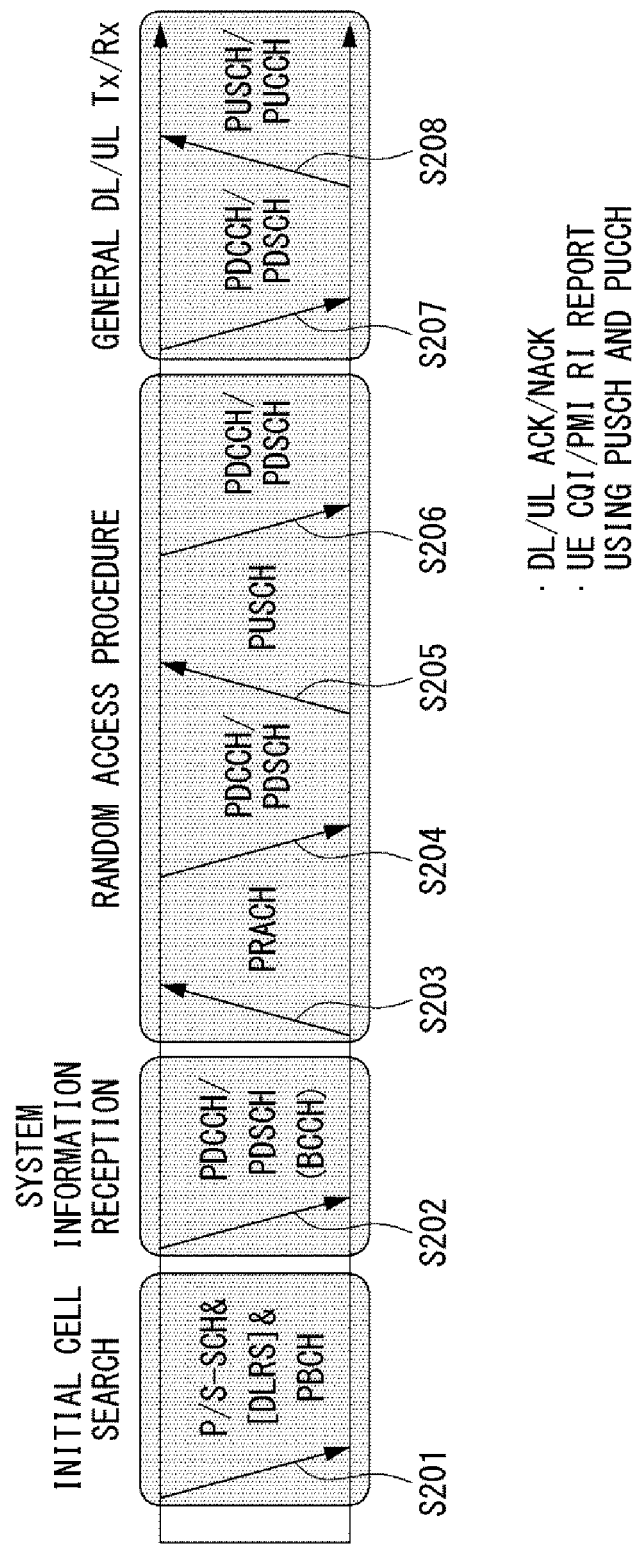
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SIBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
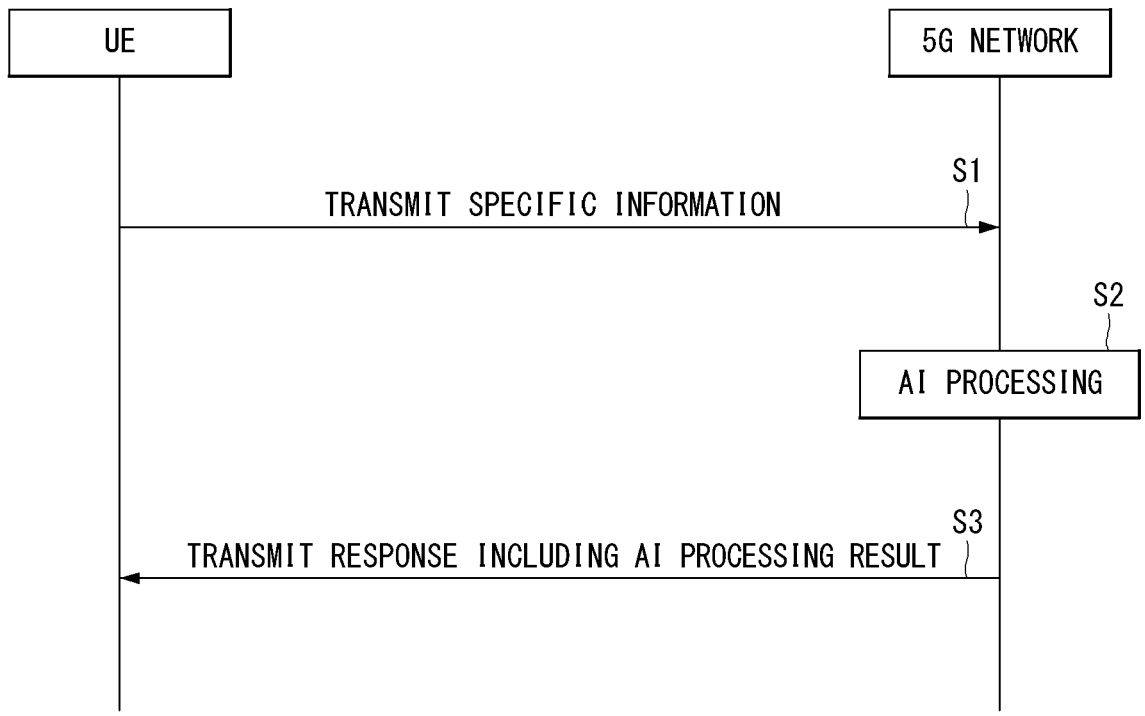
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
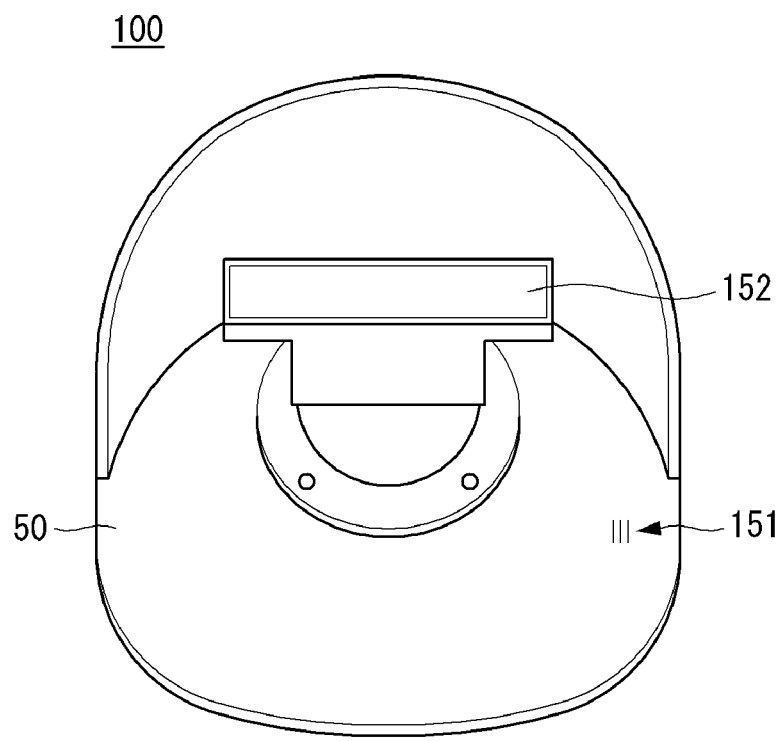
FIG. 4 is a perspective view of an intelligent robot cleaner in accordance with an embodiment of the present disclosure when seen from above.
Figure 5:
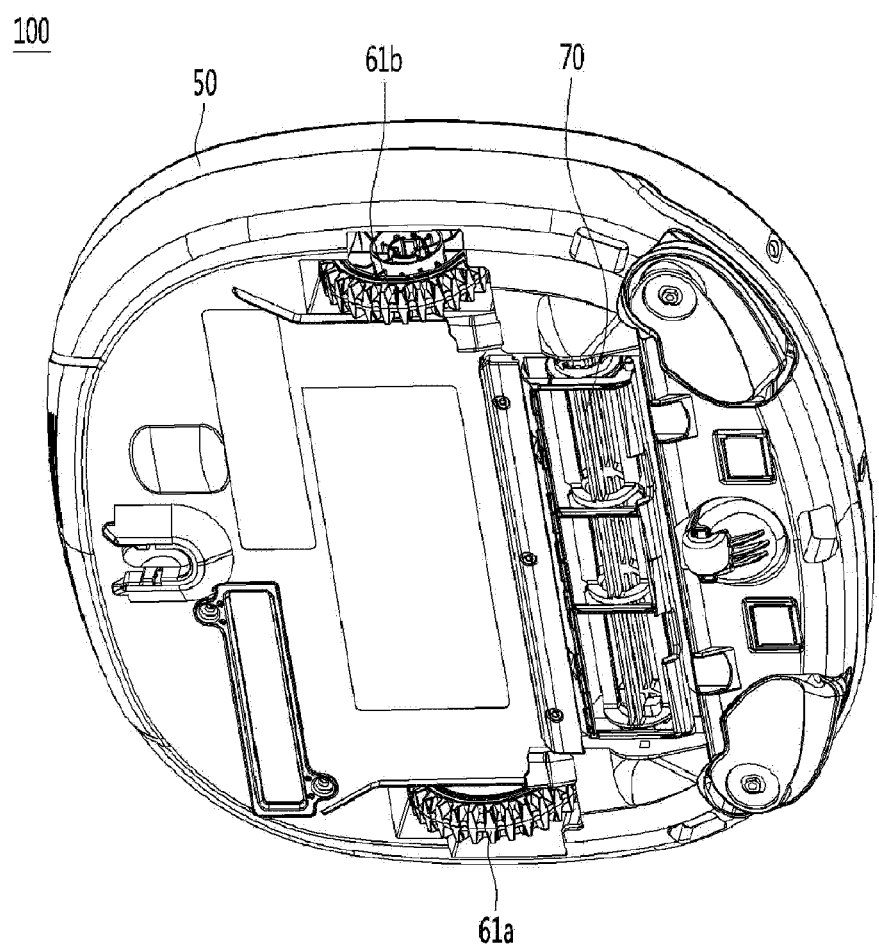
FIG. 5 is a perspective view of the intelligent robot cleaner in accordance with the embodiment of the present disclosure when seen from below.
Figure 6:
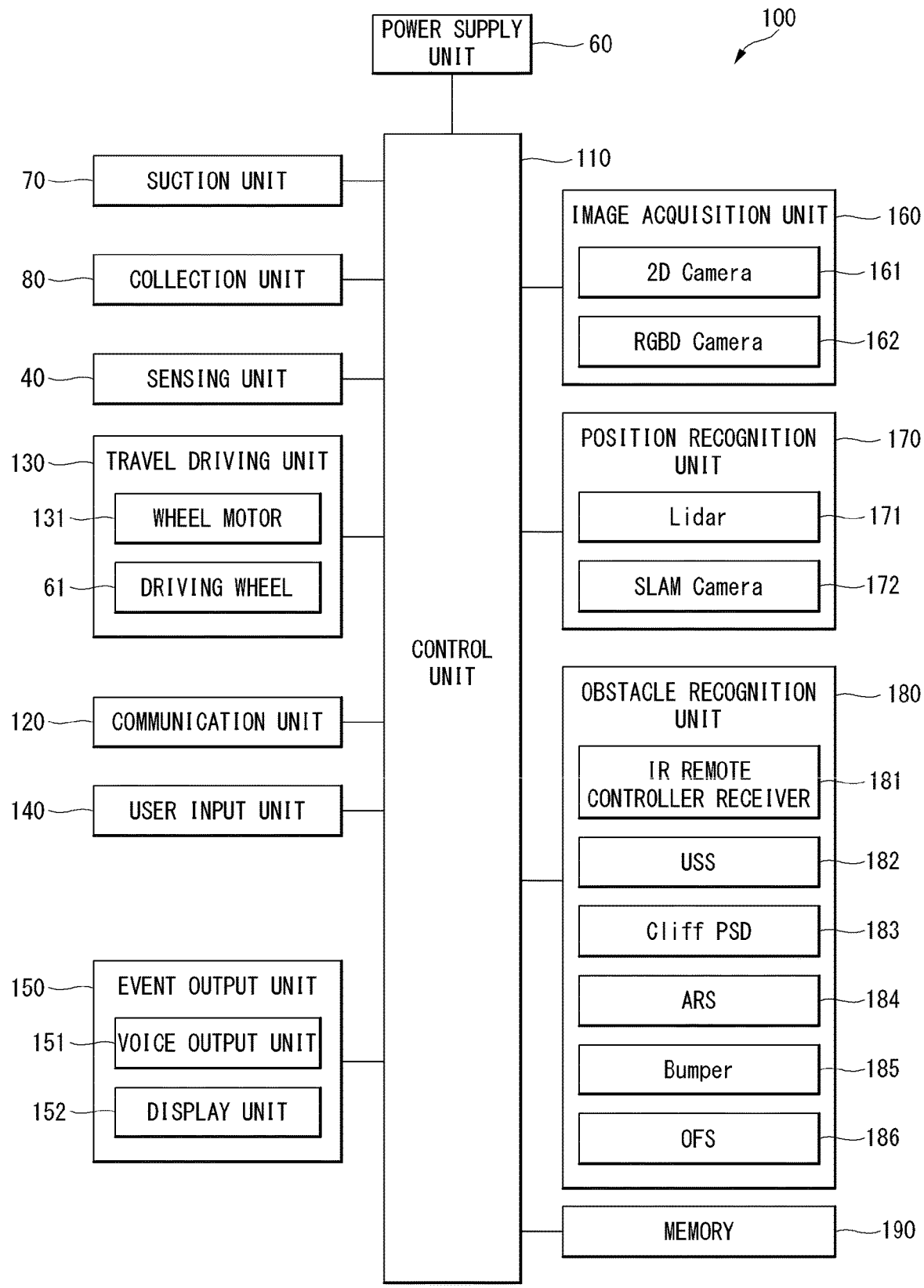
FIG. 6 is a block diagram showing the configuration of the intelligent robot cleaner in accordance with the embodiment of the present disclosure.

FIGS. 4 and 5 are perspective views of an intelligent robot cleaner in accordance with an embodiment of the present disclosure. FIG. 4 is a perspective view of the intelligent robot cleaner in accordance with the embodiment of the present disclosure when seen from above. FIG. 5 is a perspective view of the intelligent robot cleaner in accordance with the embodiment of the present disclosure when seen from below. FIG. 6 is a block diagram showing the configuration of the intelligent robot cleaner in accordance with the embodiment of the present disclosure.

Referring to FIGS. 4 to 6, the intelligent robot cleaner 100 in accordance with the embodiment of the present disclosure may include a housing 50, a sensing unit 40, a suction unit 70, a collection unit 80, a power supply unit 60, a control unit 110, a communication unit 120, a travel driving unit 130, a user input unit 140, an event output unit 150, an image acquisition unit 160, a position recognition unit 170, an obstacle recognition unit 180 and a memory 190.

The housing 50 may provide a space in which internal components are installed, and may define the appearance of the intelligent robot cleaner 100. The housing 50 may protect the components installed in the intelligent robot cleaner 100 from being protected from an outside.

The power supply unit 60 may include a battery driver and a lithium-ion battery. The battery driver may manage the charging or discharging of the lithium-ion battery. The lithium-ion battery may supply power for driving the robot. The lithium-ion battery may be made by connecting two 24V/102 A lithium-ion batteries in parallel.

The suction unit 70 may suck dust or foreign matter from a cleaning target region. The suction unit 70 may use the principle of forcing air to flow using a fan that is rotated by a motor or the like.

The collection unit 80 may be connected to the suction unit 70 via a predetermined pipe. The collection unit 80 may include a predetermined space to collect dust, foreign matter or an article sucked through the suction unit 70. The collection unit 80 may be detachably mounted on the housing 50. The collection unit 80 may collect the dust, the foreign matter or the article sucked through the suction unit 70 while the collection unit is mounted on the housing 50. The collection unit 80 may be detached from the housing 50 to take out or throw away the collected dust, foreign matter or article. The collection unit 80 may be referred to as a dust box, a foreign-matter container or the like.

The sensing unit 40 may be mounted on the housing 50 and may primarily sense the foreign matter sucked through the suction unit 70 under the control of the control unit 110 that will be described later. If articles other than the foreign matter are sensed, the sensing unit may secondarily sense the articles collected in the collection unit 80. This will be described below in detail.

The control unit 110 may include a microcomputer to control the power supply unit 60 including the battery in a hardware of the intelligent robot cleaner 100, the obstacle recognition unit 180 including various sensors, the travel driving unit 130 including a plurality of motors and wheels, the sensing unit 40 and the collection unit 80.

The control unit 110 may include an application processor (AP) to perform the function of controlling an entire system of a hardware module of the intelligent robot cleaner 100. The control unit 110 may be referred to as a processor. The AP is intended to drive an application program for the travel using position information acquired via various sensors and to drive the motor by transmitting user input/output information to the microcomputer. Furthermore, the user input unit 140, the image acquisition unit 160, the position recognition unit 170 and the like may be controlled by the AP.

Furthermore, the control unit 110 may include the AI processor 111. The AI processor 111 may learn a neural network using a program stored in the memory 190. Particularly, the AI processor 111 may learn a neural network for recognizing an article sensed by the intelligent robot cleaner 100. Here, the neural network may include a deep learning model developed from a neural network model. While a plurality of network nodes is located at different layers in the deep learning model, the nodes may exchange data according to a convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

The intelligent robot cleaner 100 may implement the function of analyzing an image for all or a part of an article sensed by the sensing unit 40 and extracting the characteristics of the article, by applying the deep learning model through the AI processor 111. Alternatively, the intelligent robot cleaner 100 may implement the function of analyzing the image of a object acquired by the image acquisition unit 160, recognizing the position of the object and recognizing an obstacle, by applying the deep learning model through the AI processor 111. The intelligent robot cleaner 100 may implement at least one of the above-described functions by receiving the AI processing result from an external server through the communication unit.

The communication unit 120 may further include a component receiving a signal/data from external input, and various additional components, such as a wireless communication module (not shown) for wireless communication or a tuner (not shown) for tuning a broadcast signal, according to the design method of the intelligent robot cleaner 100. The communication unit 120 may not only receive a signal from an external device, but also may transmit the information/data/signal of the intelligent robot cleaner 100 to the external device. That is, the communication unit 120 may be implemented as an interface facilitating two-way communication, without being limited to only the configuration of receiving the signal of the external device. The communication unit 120 may receive a control signal for selecting an UI from a plurality of control devices. The communication unit 120 may include wireless communication, wire communication and mobile communication modules. For example, the communication unit 120 may be configured as a communication module for known near field wireless communication, such as wireless LAN (WiFi), Bluetooth, Infrared (IR), Ultra Wideband (UWB) or Zigbee. The communication unit 120 may be configured as a mobile communication module such as 3G, 4G, LTE or 5G communication modules. The communication unit 120 may be configured as a known communication port for wire communication. The communication unit 120 may be used for various purposes. For example, the communication unit may be used to transmit and receive a control signal for selecting the UI, a command for manipulating a display, or data.

The travel driving unit 130 may include a wheel motor 131 and a driving wheel 61. The driving wheel 61 may include first and second driving wheels 61a and 61b. The wheel motor 131 may control the first driving wheel 61a and the second driving wheel 61b. The wheel motor 131 may be driven under the control of the travel driving unit 130. The first driving wheel 61a and the second driving wheel 61b fastened to the wheel motor 131 may be individually separated. The first driving wheel 61a and the second driving wheel 61b may be operated independently from each other. Thus, the intelligent robot cleaner 100 may be moved forwards/backwards and rotated in either direction.

The user input unit 140 may transmit various control commands or information, which are preset by a user's manipulation and input, to the control unit 110. The user input unit 140 may be made as a menu-key or an input panel provided on an outside of the intelligent robot cleaner, a remote controller separated from the intelligent robot cleaner 100 or the like. Alternatively, some components of the user input unit 140 may be integrated with a display unit 152. The display unit 152 may be a touch-screen. For example, a user touches an input menu displayed on the display unit 152 that is the touch-screen to transmit a preset command to the control unit 110.

The user input unit 140 may sense a user's gesture through the sensor that senses an interior of the region and transmit his or her command to the control unit 110. Alternatively, the user input unit 140 may transmit a user's voice command to the control unit 110 to perform an operation and setting.

When a object is extracted from an image acquired through the image acquisition unit 160 or other event situations occur, the event output unit 150 may be configured to inform a user of the event situation. The event extraction unit 150 may include a voice output unit 151 and the display unit 152.

The voice output unit 151 may output a pre-stored voice message when a specific event occurs.

The display unit 152 may display a pre-stored message or image when a specific event occurs. The display unit 152 may display the driving state of the intelligent robot cleaner 100 or display additional information, such as the date/time/temperature/humidity of a current state.

The image acquisition unit 160 may include a 2D camera 161 and a RGBD camera 162. The 2D camera 161 may be a sensor for recognizing a person or an article based on a 2D image. The RGBD (Red, Green, Blue and Distance) camera 162 may be a sensor for detecting a person or an article using captured images having depth data acquired from a camera having RGBD sensors or other similar 3D imaging devices.

The image acquisition unit 160 may provide, image data acquired by photographing foreign matter or an article sucked through the intelligent robot cleaner 100 or image data acquired by photographing collected foreign matter or article, to the control unit 110. The control unit 110 may re-sense the foreign matter or article based on the image data.

Furthermore, the image acquisition unit 160 may acquire the image on the travel path of the intelligent robot cleaner 100 and then provide the acquired image data to the control unit 110. The control unit 110 may reset the travel path based on the acquired image data.

The position recognition unit 170 may include a light detection and ranging (lidar) 171 and a simultaneous localization and mapping (SLAM) camera 172.

The SLAM camera may implement concurrent position tracking and mapping techniques. The intelligent robot cleaner 100 may detect information about surrounding environment using the SLAM camera 172 and then may process the obtained information to prepare a map corresponding to a mission execution space and simultaneously estimate the absolute position of the cleaner.

The lidar 171 is a laser radar, and may be a sensor that radiates a laser beam, collects and analyzes backscattered light among light absorbed or scattered by an aerosol to recognize a position.

The position recognition unit 170 may process sensing data collected from the lidar 171 and the SLAM camera 172 to manage data for recognizing the robot's position and the obstacle.

The obstacle recognition unit 180 may include an IR remote controller receiver 181, an USS 182, a Cliff PSD 183, an ARS 184, a bumper 185, and an OFS 186.

The IR remote controller receiver 181 may include a sensor that receives a signal of the IR (infrared) remote controller to remotely control the intelligent robot cleaner 100.

The ultrasonic sensor (USS) 182 may include a sensor to determine a distance between the obstacle and the robot using an ultrasonic signal.

The Cliff PSD 183 may include a sensor to sense a cliff or a precipice in a travel range of the intelligent robot cleaner 100 in all directions at 360 degrees.

The attitude reference system (ARS) 184 may include a sensor to detect the attitude of the robot. The ARS 184 may include a sensor configured as three axes of acceleration and three axes of gyro to detect the rotating amount of the intelligent robot cleaner 100.

The bumper 185 may include a sensor to sense a collision between the intelligent robot cleaner 100 and the obstacle. The sensor included in the bumper 185 may sense the collision between the intelligent robot cleaner 100 and the obstacle in a range of 360 degrees.

The optical flow sensor (OFS) 186 may include a sensor that may measure the travel distance of the intelligent robot cleaner 100 on various floor surfaces and a phenomenon in which the intelligent robot cleaner 100 runs idle during the travel.

The memory 190 may store a name of an article corresponding to the obstacle, image information corresponding thereto, and various image information about the article collected by the collection unit 80.

Figure 7:
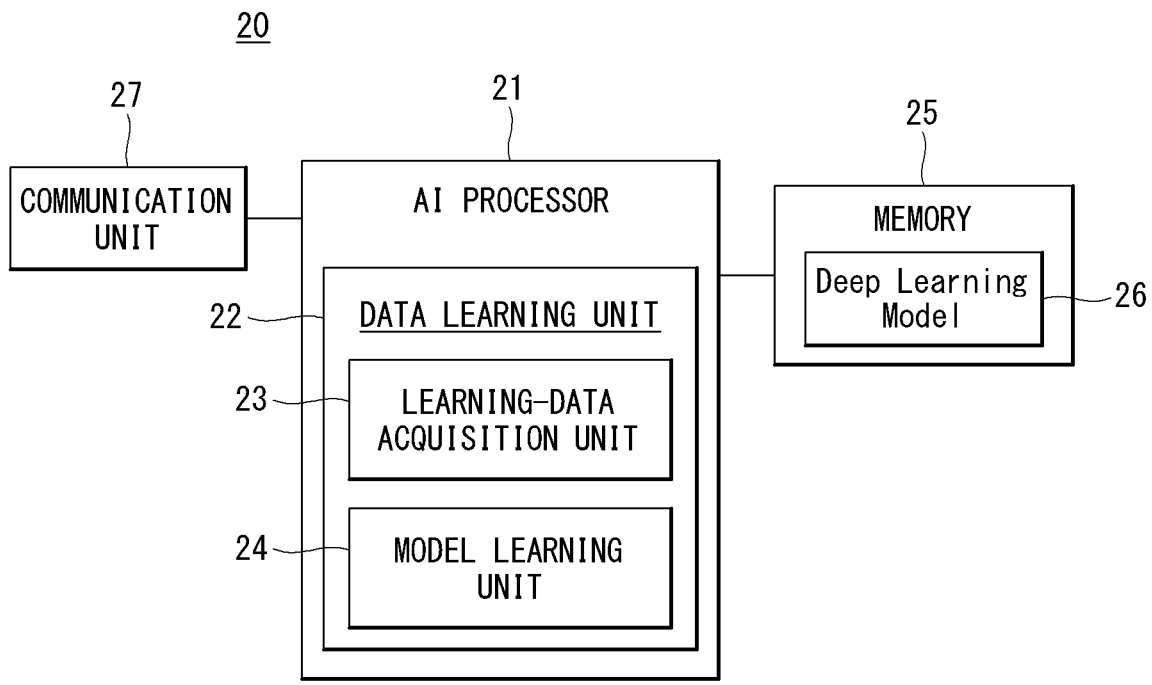
FIG. 7 is a block diagram of an AI device in accordance with the embodiment of the present disclosure.

FIG. 7 is a block diagram of an AI device in accordance with the embodiment of the present disclosure.

The AI device 20 may include electronic equipment that includes an AI module to perform AI processing or a server that includes the AI module. Furthermore, the AI device 20 may be included in at least a portion of the intelligent robot cleaner 100 illustrated in FIG. 6, and may be provided to perform at least some of the AI processing.

The AI processing may include all operations related to the function of the intelligent robot cleaner 100 illustrated in FIG. 4. For example, the intelligent robot cleaner may AI-process sensing data or travel data to perform processing/ determining and a control-signal generating operation. Furthermore, for example, the intelligent robot cleaner may AI-process data acquired through interaction with other electronic equipment provided in the intelligent robot cleaner to control sensing.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent robot cleaner 100. Here, the neural network for recognizing data related to the intelligent robot cleaner 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/ update of data by the AI processor 21 may be performed.

Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/ recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent robot cleaner 100.

Furthermore, the data learning unit 22 may further include a model evaluation unit (not shown) to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Here, the external electronic equipment may be defined as the intelligent robot cleaner 100. Furthermore, the AI device 20 may be defined as another intelligent robot cleaner 100 or a 5G network that communicates with the intelligent robot cleaner 100. Meanwhile, the AI device 20 may be implemented by being functionally embedded in an autonomous driving module provided in the intelligent robot cleaner 100. Furthermore, the 5G network may include a server or a module that performs related control of the intelligent robot cleaner 100.

Although the AI device 20 illustrated in FIG. 7 is functionally divided into the AI processor 21, the memory 25, the communication unit 27 and the like, it is to be noted that the above-described components are integrated into one module, which is referred to as an AI module.

Figure 8:
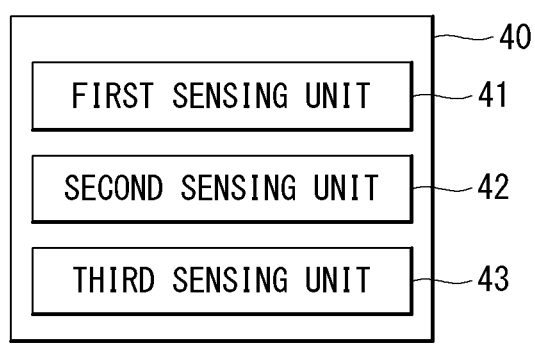
FIG. 8 is a block diagram showing the configuration of the intelligent robot cleaner in accordance with the embodiment of the present disclosure.

FIG. 8 is a block diagram showing the configuration of the intelligent robot cleaner in accordance with the embodiment of the present disclosure.

Referring to FIG. 8, the intelligent robot cleaner 100 of the present disclosure may include at least one sensing unit 40.

The at least one sensing unit 40 may be mounted on the intelligent robot cleaner 100. The at least one sensing unit 40 may be disposed around the suction unit 70, the collection unit 80, and the image acquisition unit 160.

The at least one sensing unit 40 may include first to third sensing units 41 to 43.

The first sensing unit 41 may be disposed between the suction unit 70 and the collection unit 80 or near an upper portion of the collection unit 80. The first sensing unit 41 may sense the foreign matter or the article sucked through the suction unit 70. For example, the first sensing unit 41 may include a camera image sensor. The first sensing unit 41 may photograph the foreign matter or the article sucked through the suction unit 70 to sense their images. The first sensing unit 41 may extract characteristics of all or a part of the article from the sensed image and may transmit the extracted characteristics to the control unit 110.

The second sensing unit 42 may be disposed near a lower portion of the collection unit 80. The second sensing unit 42 may sense the weight of the foreign matter or the article sucked through the suction unit 70. For example, the second sensing unit 42 may include a weight sensor that may sense a weight or a pressure sensor that may sense pressure. The second sensing unit 42 may sense the weight of the foreign matter or the article collected in the collection unit 80. When the weight of the collected foreign matter or article is abruptly changed, the second sensing unit may transmit it to the control unit 110.

The third sensing unit 43 may be mounted or disposed on a periphery of the collection unit 80 or an outer surface of the collection unit 80. The third sensing unit 43 may sense a sound generated while the foreign matter or the article is collected in the collection unit 80. The third sensing unit 43 may include a microphone sensor. The third sensing unit 43 senses the sound generated while the foreign matter or the article is collected in the collection unit 80. Here, if the sensed sound is bigger than a preset sound, this may be transmitted to the control unit 110.

Figure 9:
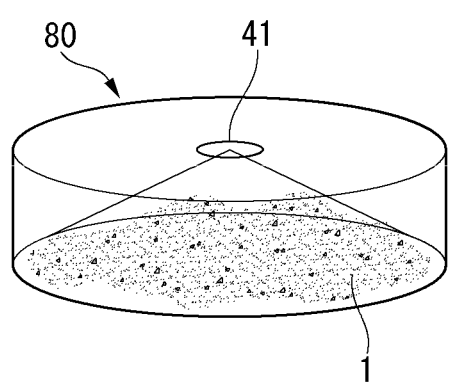
FIGS. 9A and 9B are an example illustrating a sensing method using a first sensing unit mounted on the intelligent robot cleaner in accordance with the embodiment of the present disclosure.
Figure 9:
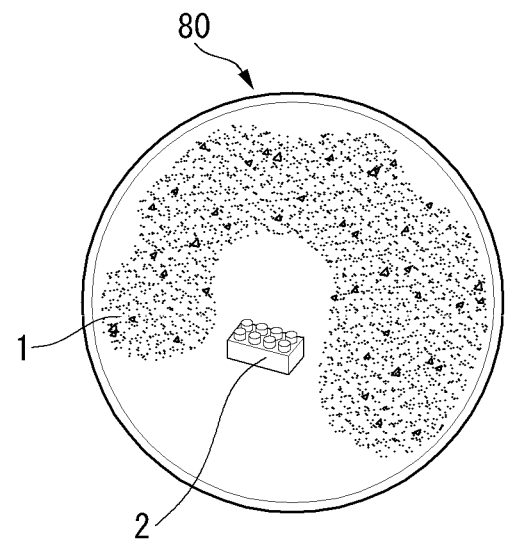
Figure 10:
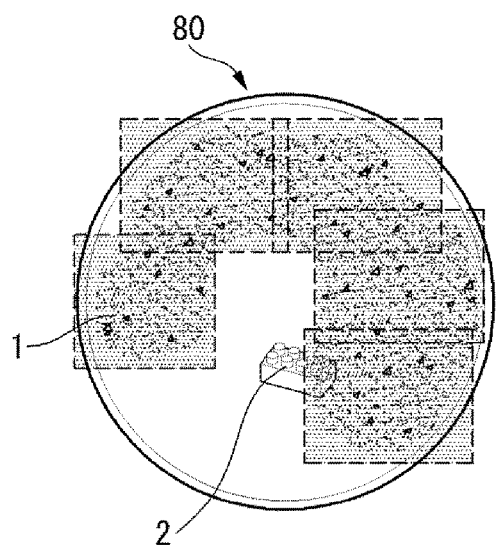
FIGS. 10A to 10D are an example illustrating a method of recognizing an article sensed by a first sensing unit in accordance with the embodiment of the present disclosure.
Figure 10:
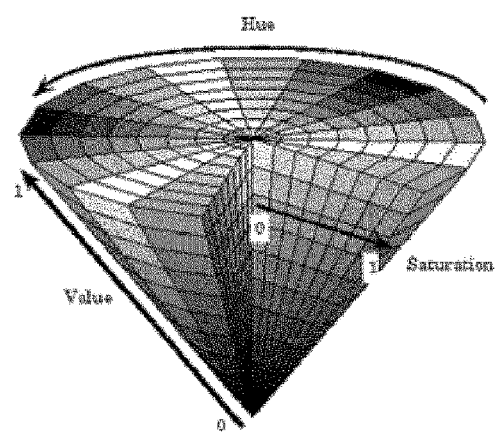
Figure 10:
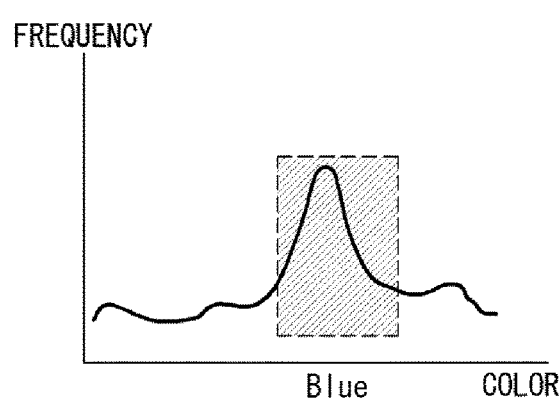
Figure 10:
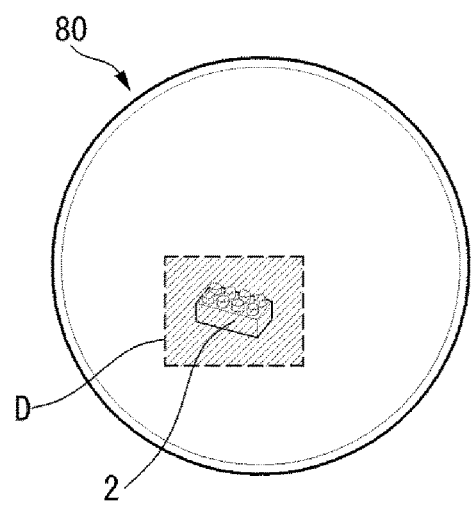
Figure 11:
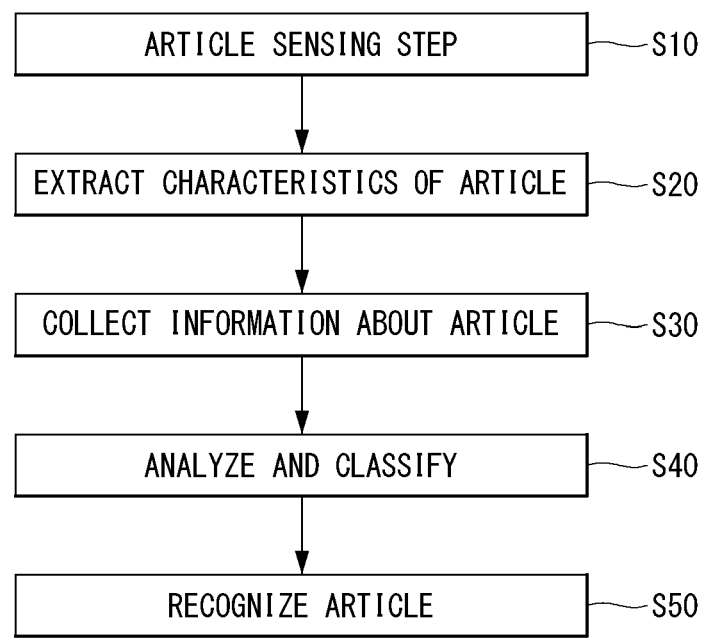
FIG. 11 is a block diagram for recognizing an article collected in a collection unit in accordance with the embodiment of the present disclosure.

FIGS. 9A and 9B are an example illustrating a sensing method using the first sensing unit mounted on the intelligent robot cleaner in accordance with the embodiment of the present disclosure. FIGS. 10A to 10D are an example illustrating a method of recognizing the article sensed by the first sensing unit in accordance with the embodiment of the present disclosure. FIG. 11 is a block diagram for recognizing the article collected in the collection unit in accordance with the embodiment of the present disclosure.

The first sensing unit 41 may be disposed between the suction unit 70 and the collection unit 80 or near the upper portion of the collection unit 80. Although not shown in FIGS. 9A and 9B, the collection unit 80 may be connected to the suction unit 70 via a pipe (not shown). The pipe may be referred to as a dust inlet port. One end of the pipe (not shown) may be connected to the collection unit 80, while the other end may be connected to the suction unit 70. The pipe (not shown) may supply the foreign matter or the article sucked through the suction unit 70 to the collection unit 80.

As illustrated in FIG. 9A, the first sensing unit 41 may be disposed on the upper portion of the collection unit 80. The first sensing unit 41 may sense the foreign matter 1 or the article 2 collected in the collection unit 80. For example, the first sensing unit 41 may include the camera image sensor.

As illustrated in FIG. 9B, the first sensing unit 41 may photograph the foreign matter 1 or the article 2 collected in the collection unit 80, and may sense an image for the photographed foreign matter 1 or an image for the photographed article 2. The first sensing unit 41 may photograph all or a part of the article 2 according to the amount or size of the foreign matter 1 collected in the collection unit 80.

As illustrated in FIG. 10A, the first sensing unit 41 may sense the foreign matter 1 collected in the collection unit 80 as at least one image. The control unit may be provided with at least one foreign-matter image sensed by the first sensing unit 41, and may be expressed as a gray image which is a black-and-white image.

The control unit may be provided with an article image sensed by the first sensing unit 41 to analyze the color of the article. As illustrated in FIG. 10B, the control unit may compare and analyze the color of the article using a preset color distribution and then may extract the color of the article relatively accurately. As illustrated in FIG. 10C, the control unit may extract or detect a portion of the color of the article with high frequency in the article image. As illustrated in FIG. 10D, the control unit may set a region of interest (ROI) in the article image acquired by the first sensing unit 41. For example, the control unit may acquire an initial article image through the first sensing unit 41. The initial article image may include a plurality of parts (e.g., foreign matter) that are unnecessary to analyze the image. The control unit may significantly increase an image analysis time due to the unnecessary parts. Thus, the control unit may perform a pattern matching calculation only on the region that is essential for image analysis, by designating the region of interest for the sensed article in the initial article image.

Referring to FIG. 11, the control unit may sense the article sucked by the suction unit or the article collected by the collection unit, at step S10.

The control unit may extract the characteristics of the article from the sensed article, at step S20. The control unit may extract the characteristics of the article based on a portion of the article that is seen, except for a portion of the photographed article image that is covered by the foreign matter. When the extracted article is a portion, the control unit may learn the neural network using the program stored in the memory 190 (see FIG. 5). For example, the control unit 110 (see FIG. 5) may accurately extract the characteristics for the article, by learning the neural network for extracting the characteristics of the article and continuing the deep learning.

The control unit may collect information about the article based on the extracted characteristics of the article, at step S30. The control unit may collect information about the article based on the characteristics of the article using the communication unit 120 (see FIG. 5) or the memory 190 (see FIG. 5).

The calculation for collecting information about the article based on the characteristics of the article may be very complicated. Thus, the control unit may extract the characteristics of the article rapidly and accurately by using high-tech neural network control, which is the latest logic circuit, and may collect the information of the article corresponding to the extracted characteristics of the article. The control unit may correlate pieces of information about the complicated article like the human brain to collect various pieces of information about the article with an appropriate determination in a short period of time, by using the neural network control that is the logic circuit designed to be close to the human brain's determination function.

The control unit may analyze the information about the collected article and classify the article, at step S40. The control unit may analyze various pieces of information about the collected article using the high-tech neural network control, which is the latest logic circuit, may correlate the pieces of information about the analyzed article with each other and then may classify the article in a short period of time.

The control unit may extract or recognize the analyzed and classified article, at step S50. The control unit may accurately identify and recognize the analyzed and classified article using the neural network control.

Figure 12:
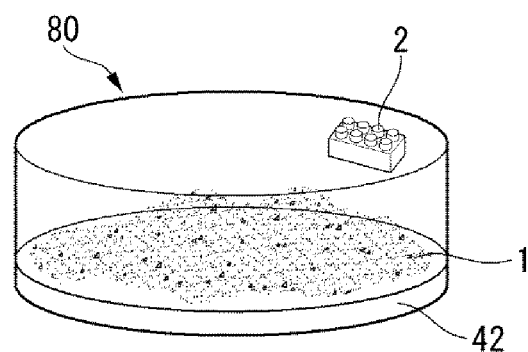
FIG. 12 is an example illustrating a sensing method using a second sensing unit mounted on the intelligent robot cleaner in accordance with the embodiment of the present disclosure.
Figure 13:
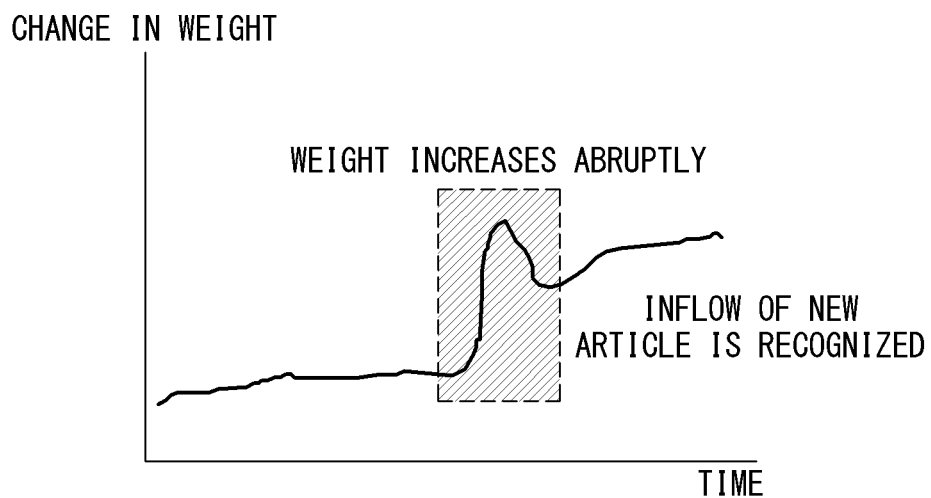
FIG. 13 is an example illustrating a method of recognizing an article sensed by the second sensing unit in accordance with the embodiment of the present disclosure.

FIG. 12 is an example illustrating a sensing method using the second sensing unit mounted on the intelligent robot cleaner in accordance with the embodiment of the present disclosure. FIG. 13 is an example illustrating a method of recognizing the article sensed by the second sensing unit in accordance with the embodiment of the present disclosure.

Referring to FIGS. 12 and 13, the second sensing unit 42 may be disposed on the lower portion of the collection unit 80. The second sensing unit 42 may sense the weight or pressure of the foreign matter 1 or the article 2 collected in the collection unit 80. The second sensing unit 42 may include the weight sensor that may sense the weight or the pressure sensor that may sense the pressure.

Although FIG. 12 illustrates that one second sensing unit 42 is disposed on the lower portion of the collection unit 80, the present disclosure is not limited thereto. At least one second sensing unit 42 may be disposed on the lower portion of the collection unit 80. A plurality of second sensing units 42 may be disposed at regular intervals.

As illustrated in FIG. 13, a horizontal line of a graph represents a cleaning time, while a vertical line thereof represents a change in weight for the dust or the foreign matter accumulated in the collection unit. The intelligent robot cleaner 100 continues to suck the dust or the foreign matter through the suction unit 70, and collects the sucked dust or foreign matter in the collection unit 80.

While the intelligent robot cleaner 100 cleans, it continues to suck the dust or the foreign matter, so that the weight of the collection unit may be gradually increased.

The second sensing unit 42 may sense the weight of the dust or the foreign matter that is gradually accumulated in the collection unit 80 in real time. When the weight of the collection unit increases abruptly, the second sensing unit 42 may sense the increase of weight and transmit the changed weight signal to the control unit 110 (see FIG. 5).

If the weight signal is provided from the second sensing unit 42, the control unit 110 (see FIG. 5) may determine that articles other than the dust or foreign matter are collected in the collection unit 80. Thus, the control unit 110 (see FIG. 5) may transmit a notification message to a registered user's mobile device using the communication unit 120 (see FIG. 5), or may display the notification message using the display unit 152 (see FIG. 5) of the intelligent robot cleaner 100.

Alternatively, the control unit 110 (see FIG. 5) may output a notification signal in the form of a sound to notify a user that the intelligent robot cleaner 100 sucks the article 2 instead of the foreign matter 1.

Figure 14:
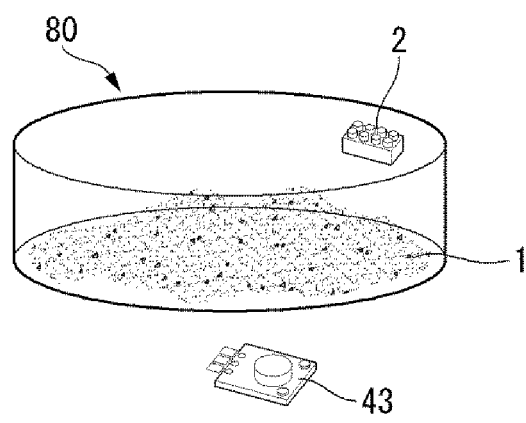
FIG. 14 is an example illustrating a sensing method using a third sensing unit mounted on the intelligent robot cleaner in accordance with the embodiment of the present disclosure.
Figure 15:
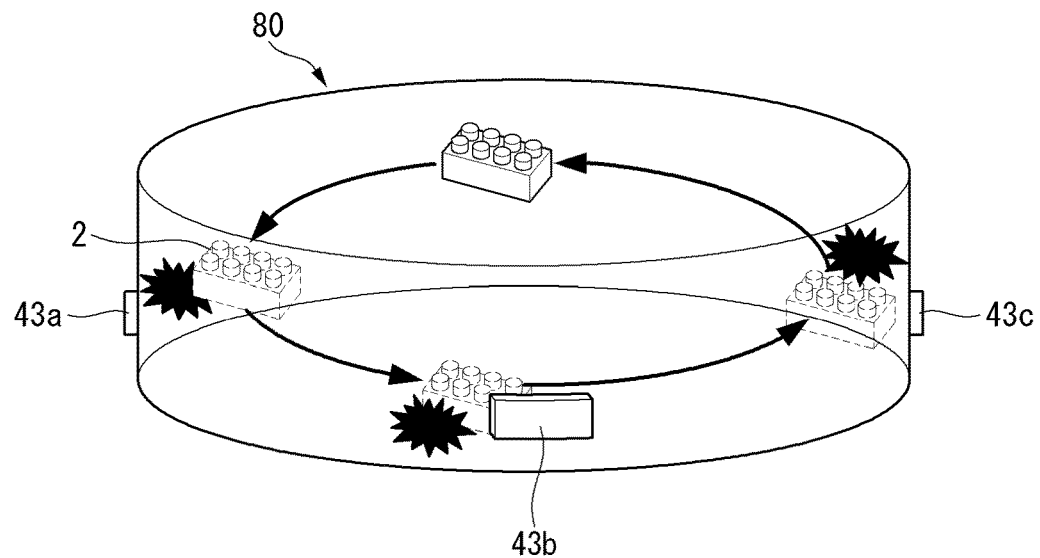
FIG. 15 is an example illustrating a method of recognizing an article sensed by the third sensing unit in accordance with the embodiment of the present disclosure.
Figure 16:
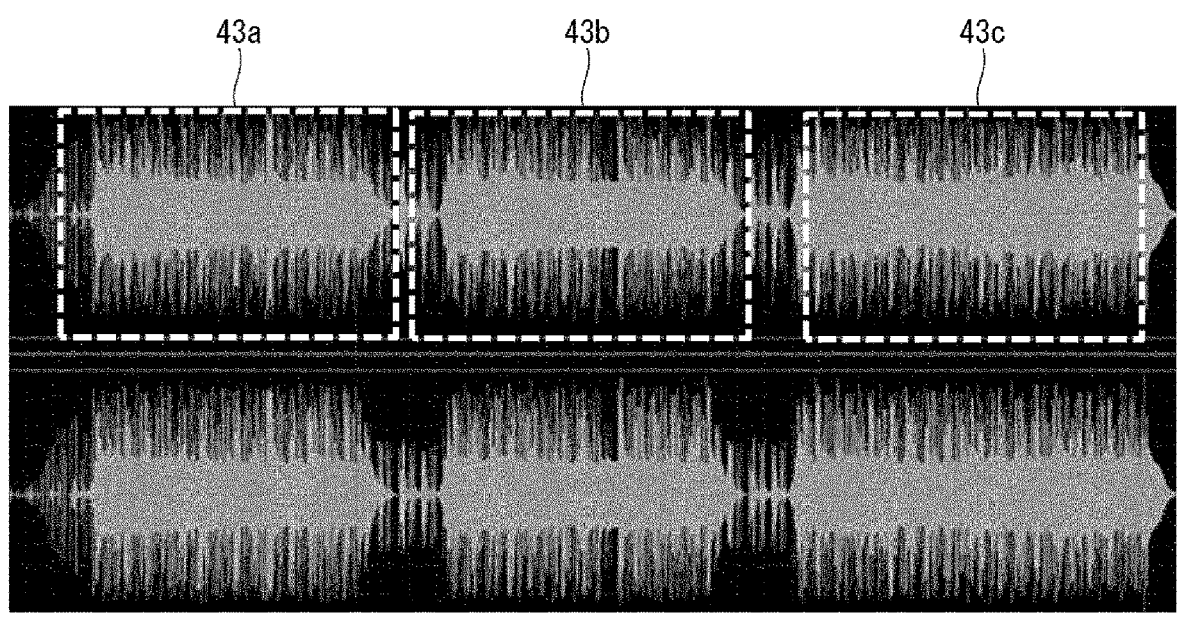
FIG. 16 is an example illustrating a frequency of recognizing the article sensed by the third sensing unit in accordance with the embodiment of the present disclosure.

FIG. 14 is an example illustrating a sensing method using the third sensing unit mounted on the intelligent robot cleaner in accordance with the embodiment of the present disclosure. FIG. 15 is an example illustrating a method of recognizing the article sensed by the third sensing unit in accordance with the embodiment of the present disclosure. FIG. 16 is an example illustrating a frequency of recognizing the article sensed by the third sensing unit in accordance with the embodiment of the present disclosure.

Referring to FIGS. 14 to 16, the third sensing unit 43 may be mounted or disposed on the periphery of the collection unit 80 or the circumferential surface of the collection unit 80. The third sensing unit 43 may sense sound generated while the foreign matter or the article is collected in the collection unit 80. The third sensing unit 43 may include a microphone sensor.

While the article 2 is introduced through the inlet port and collides with the collection unit 80, a predetermined sound or noise may be generated. The third sensing unit 43 may sense the sound or noise that is generated while the article 2 and the collection unit 80 collide with each other or the article 2 introduced through the inlet port falls into the collection unit 80. For example, assuming that the article is Lego, the third sensing unit 43 may sense the sound or noise that is generated while the Lego is moved by the pressure of the collection unit 80 and then collides with the collection unit 80 or the dust box.

At least one third sensing unit 43 may be provided. For example, the third sensing unit 43 may a thirty-first sensing unit 43a to a thirty-third sensing unit 43c.

The thirty-first sensing unit 43a to the thirty-third sensing unit 43c disposed on the circumferential surface of the collection unit 80 may be arranged at regular intervals. Although FIG. 14 illustrates that the thirty-first sensing unit 43a to the thirty-third sensing unit 43c are disposed at the same height on the circumferential surface of the collection unit 80, the present disclosure is not limited thereto. The thirty-first sensing unit 43a to the thirty-third sensing unit 43c may be disposed at different heights on the circumferential surface of the collection unit 80. One sensing unit of the thirty-first sensing unit 43a to the thirty-third sensing unit 43c may not be disposed on the circumferential surface of the collection unit 80 but may be disposed on the lower surface thereof.

The above-described third sensing unit 43 senses a sound generated while the foreign matter or article is collected in the collection unit 80. When the sound is bigger than a preset sound, the third sensing unit may transmit it to the control unit 110.

The sound generated while the foreign matter or the article is collected in the collection unit 80 may be represented by a frequency.

For example, the thirty-first sensing unit 43a to the thirty-third sensing unit 43c may sense the sound generated while the article collides with the collection unit 80 by the pressure of the collection unit 80 under the control of the control unit 110, and then may convert the sensed sound into the frequency. Each of the thirty-first sensing unit 43a to the thirty-third sensing unit 43c may sense the sound generated when a hard material collides with the dust box and may be expressed as the frequency as illustrated in FIG. 16.

Figure 17:
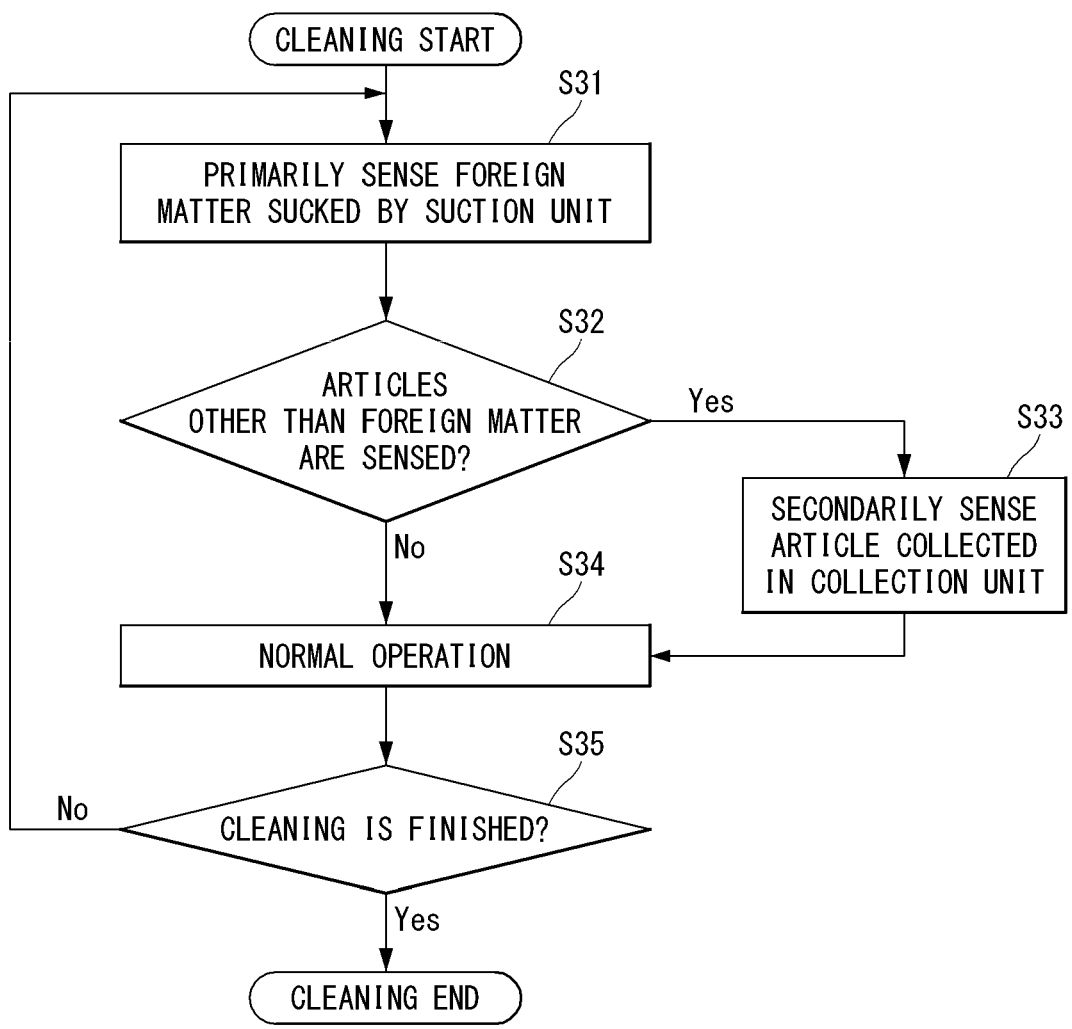
FIG. 17 is a flowchart showing a method of operating an intelligent robot cleaner in accordance with an embodiment of the present disclosure.
Figure 18:
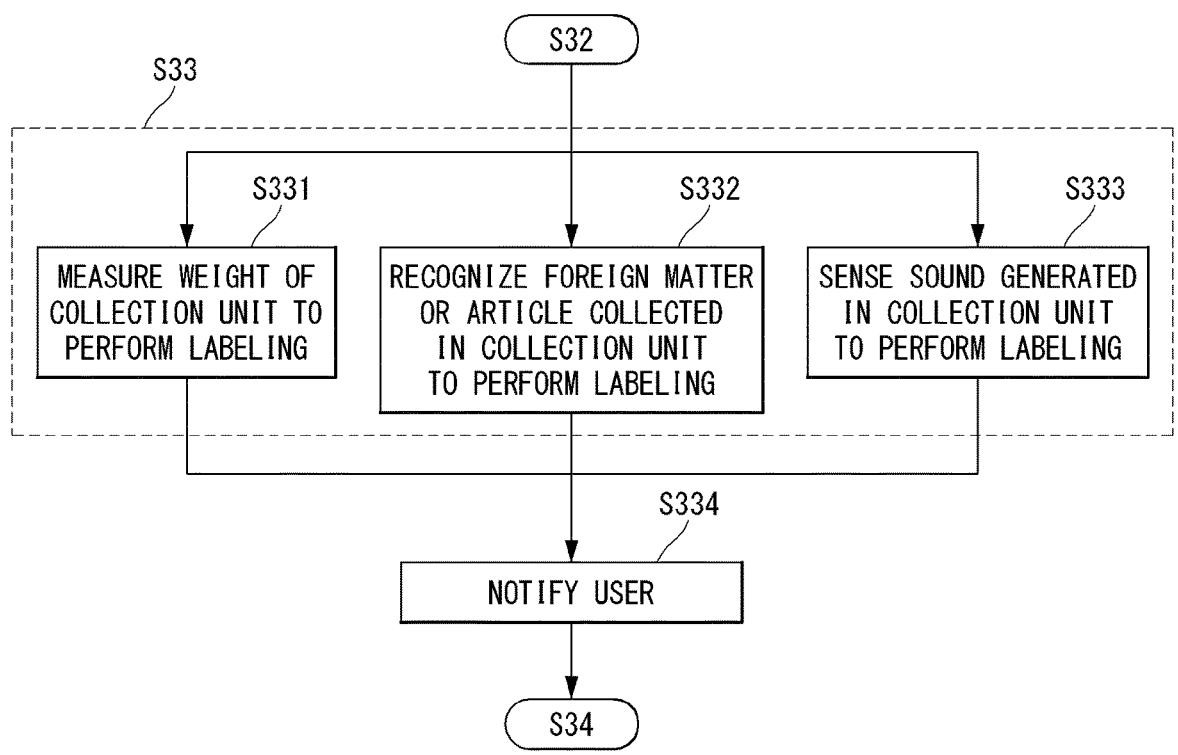
FIG. 18 is a flowchart showing secondary sensing in the method of operating the intelligent robot cleaner in accordance with the embodiment of the present disclosure.

FIG. 17 is a flowchart showing a method of operating an intelligent robot cleaner in accordance with an embodiment of the present disclosure. FIG. 18 is a flowchart showing secondary sensing in the method of operating the intelligent robot cleaner in accordance with the embodiment of the present disclosure.

Since the first sensing unit 41 to the third sensing unit 43 have been described in detail with reference to FIGS. 9 to 16, they will be described in brief in FIGS. 17 and 18.

Referring to FIGS. 5, 8, 17 and 18, the intelligent robot cleaner 100 may perform a cleaning operation for a time set by a user. For example, the intelligent robot cleaner 100 may sense a user's motion or a leave time in real time, and may start cleaning at a time when the user is not present or a time set by the user.

The intelligent robot cleaner 100 may primarily sense the foreign matter or the article sucked by the suction unit 70 with the sensing unit, at step S31.

The sensing unit 40 may include the first sensing unit 41 to the third sensing unit 43. The intelligent robot cleaner 100 may perform primary sensing using one of the first sensing unit 41 to the third sensing unit 43.

Unless the article is sensed after the primary sensing is performed using the first sensing unit 41 at step S32, the intelligent robot cleaner 100 may continue to clean normally at step S34.

Unless the article is sensed after the primary sensing is performed using one of the first sensing unit 41 to the third sensing unit 43 at step S32, the intelligent robot cleaner 100 may perform secondary sensing using the remaining sensing units at step S33.

The first sensing unit 41 may include the camera image sensor, and may recognize the foreign matter or the article introduced through the inlet port to the collection unit 80 to perform labeling, at step S332. The second sensing unit 42 may include the weight sensor or the pressure sensor, and may measure or sense the weight of the collection unit 80 containing the foreign matter or the article introduced through the inlet port to the collection unit 80 to perform labeling, at step S331. The third sensing unit 43 may include the microphone sensor, and may sense a sound generated while the collection unit 80 collides with the foreign matter or the article introduced through the inlet port to the collection unit 80 to perform labeling, at step S333.

For example, when the intelligent robot cleaner 100 primarily senses the foreign matter or the article using the first sensing unit 41 at step S32, the secondary sensing may be performed using the second sensing unit 42 or the third sensing unit 43. Alternatively, when the intelligent robot cleaner 100 primarily senses the foreign matter or the article using the second sensing unit 42, the secondary sensing may be performed using the third sensing unit 43 or the first sensing unit 41. Alternatively, when the intelligent robot cleaner 100 primarily senses the foreign matter or the article using the third sensing unit 43, the secondary sensing may be performed using the first sensing unit 41 or the second sensing unit 42.

Although FIG. 18 illustrates that the secondary sensing is performed using one of the remaining sensing units if the article is sensed after the intelligent robot cleaner 100 performs the primary sensing using one of the first sensing unit 41 to the third sensing unit 43, the present disclosure is not limited thereto.

For example, when the foreign matter or the article is primarily sensed using the first sensing unit 41, the intelligent robot cleaner 100 may perform the secondary sensing using the second sensing unit 42 and then perform the third sensing using the third sensing unit 43. Further, when the foreign matter or the article is primarily sensed using the first sensing unit 41, the intelligent robot cleaner 100 may perform the secondary sensing using the third sensing unit 43 and then perform the third sensing using the second sensing unit 42.

Alternatively, when the foreign matter or the article is primarily sensed using the second sensing unit 42, the intelligent robot cleaner 100 may perform the secondary sensing using the third sensing unit 43 and then perform the third sensing using the first sensing unit 41. Further, when the foreign matter or the article is primarily sensed using the second sensing unit 41, the intelligent robot cleaner 100 may perform the secondary sensing using the first sensing unit 41 and then perform the third sensing using the third sensing unit 43.

Alternatively, when the foreign matter or the article is primarily sensed using the second sensing unit 42, the intelligent robot cleaner 100 may perform the secondary sensing using the first sensing unit 41 and then perform the third sensing using the second sensing unit 42. Further, when the foreign matter or the article is primarily sensed using the third sensing unit 43, the intelligent robot cleaner 100 may perform the secondary sensing using the second sensing unit 42 and then perform the third sensing using the first sensing unit 41.

As described above, the intelligent robot cleaner 100 in accordance with the embodiment of the present disclosure may perform the primary sensing using one of the first sensing unit 41 to the third sensing unit 42, and may sequentially perform the secondary sensing using the remaining sensing units 40. The intelligent robot cleaner may selectively perform the secondary sensing based on the primarily sensed result.

The intelligent robot cleaner 100 in accordance with the embodiment of the present disclosure may provide a user with information about the article, if the cleanser senses and recognizes the article sucked at least one or more times using the plurality of sensing units 40. The intelligent robot cleaner 100 in accordance with the embodiment of the present disclosure may transmit the notification message to the registered user's mobile device using the communication unit 120 (see FIG. 5), or may display the notification message using the display unit 152 (see FIG. 5) of the intelligent robot cleaner 100, at step S334.

Subsequently, the intelligent robot cleaner 100 may normally perform the cleaning operation while continuously repeating the above-described method at step S34, and may finish cleaning.

The above-described intelligent robot cleaner 100 may perform the sensing operation at least one or more times using the plurality of sensing units to accurately recognize articles other than the foreign matter and thereby provide the recognized result to the user.

Although not illustrated in the drawings, when the intelligent robot cleaner 100 in accordance with the embodiment of the present disclosure recognizes articles other than the foreign matter in the collection unit and provide the recognized result to the user but there is no his or her reaction, the intelligent robot cleaner may check and store it.

Even if the intelligent robot cleaner 100 in accordance with the embodiment of the present disclosure provides a user with the information about the article, he or she may detach the collection unit from the housing without any reaction. In this case, a warning message or information about the article may be displayed on the display unit or may be outputted through a speaker.

Figure 19:
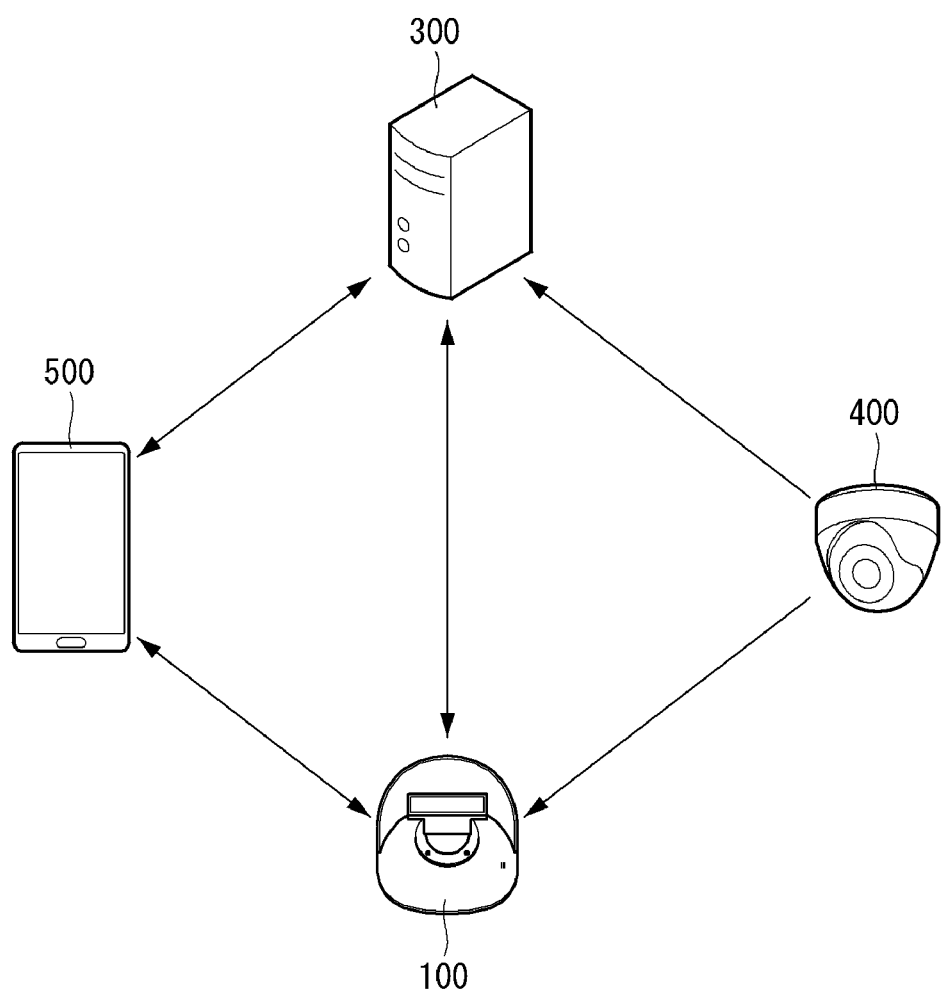
FIG. 19 is a diagram showing a cleaning system of an intelligent robot cleaner in accordance with another embodiment of the present disclosure.

FIG. 19 is a diagram showing a cleaning system of an intelligent robot cleaner in accordance with another embodiment.

Referring to FIG. 19, the cleaning system of the intelligent robot cleaner 100 in accordance with another embodiment of the present disclosure may include the intelligent robot cleaner 100, a server 300, a photographing means 400, and a portable terminal 500. The portable terminal 500 may be referred to as a user terminal or a mobile device.

The intelligent robot cleaner 100 may perform the cleaning operation while recognizing the article collected in the collection unit substantially as in the above-described embodiment. The intelligent robot cleaner 100 may include the same configuration as that of the intelligent robot cleaner 100 described with reference to FIGS. 4 to 18 or some components may be omitted.

For instance, the image acquisition unit 160 (see FIG. 5) of the intelligent robot cleaner 100 may be replaced with the photographing means 400, and at least some components of the user input unit 140 may be replaced with the portable terminal 500. The memory 190 may be replaced with the server 300 or the server 300 may be used as a part of the memory 190.

The intelligent robot cleaner 100 may transmit and receive a signal to and from the server 300 or the portable terminal 500. For example, the intelligent robot cleaner 100 may transmit and receive information about the article or the foreign matter sucked through the server 300 and the suction unit 70 (see FIG. 5) or collected in the collection unit 80 (see FIG. 5).

Furthermore, the intelligent robot cleaner 100 may receive an image photographing a cleaning target region, by the photographing means 400. The intelligent robot cleaner 100 may monitor the cleaning target region by combining the image photographed by the image acquisition unit 160 and the image received from the photographing means 400, and may extract the article. The intelligent robot cleaner 100 may be controlled according to the command received from the server 300 or the portable terminal 500, in addition to directly receiving the command from a user through the user input unit 140.

Since the AI processor 111 of the intelligent robot cleaner 100 performs learning based on more information, the accuracy of classifying and recognizing the article may be increased.

The server 300 may receive or transmit information from the intelligent robot cleaner 100, the photographing means 400, and/or the portable terminal 500. The server 300 may integrate the received information to store and control the information. For example, the server 300 may store information about the article or the foreign matter sucked through the suction unit 70 (see FIG. 5) into the intelligent robot cleaner 100 or collected in the collection unit 80 (see FIG. 5) in various forms.

The server 300 may transmit the stored information to the intelligent robot cleaner 100 or the portable terminal 500. For example, the server 300 may transmit the information about the article or the foreign matter sucked through the suction unit 70 (see FIG. 5) or collected in the collection unit 80 (see FIG. 5) to the portable terminal 500.

The photographing means 400 may include a camera installed around the cleaning target region. For example, the photographing means 400 may be a closed circuit television (CCTV) camera. The photographing means 400 may transmit the photographed image to the server 300 or the intelligent robot cleaner 100.

The portable terminal 500 may transceive data with the server 300. For example, the portable terminal 500 may transmit the image of the cleaning target region to the server 300. Furthermore, the portable terminal 500 may transceive data with the intelligent robot cleaner 100. For example, the portable terminal 500 may transmit a signal for calling the intelligent robot cleaner 100 or a specific instruction for the occurrence of an event. The intelligent robot cleaner 100 may perform a specific operation in response to the call signal received from the portable terminal 500.

As described above, an intelligent robot cleaner in accordance with an embodiment of the present disclosure can accurately classify or recognize small articles including a user's jewelry sucked through a suction unit during cleaning, by sensing an article sucked together with foreign matter at least one or more times, according to an artificial intelligence learning result, using at least one sensing units.

The intelligent robot cleaner in accordance with the embodiment of the present disclosure can prevent small articles including a user's jewelry from being lost by the intelligent robot cleaner, by accurately classifying or recognizing the small articles including the user's jewelry sucked through the suction unit during cleaning and then informing the user of the sucked articles.

Although the present disclosure has been described based on an intelligent robot cleaner, the invention may be applied to a wire or wireless vacuum cleaner without being limited thereto. Therefore, the invention can prevent small articles including a user's jewelry from being lost, by sensing an article sucked together with foreign matter according to an artificial intelligence learning result and then allowing the user to recognize the sucked article.

It should be noted that configurations described herein are illustrative and not restrictive. The scope of the present disclosure is to be determined solely by the appended claims, and various changes may be made in the present disclosure without departing from the spirit of the invention.

The invention claimed is:

1. An intelligent robot cleaner, comprising:
a housing;
a driver mounted on the housing, and configured to move in a cleaning target region along a travel path, wherein the driver comprises a motor and a wheel;
a suctioner mounted on the housing, and configured to suck foreign matter on the travel path;
a container detachably mounted on the housing, and configured to collect the foreign matter sucked through the suctioner when mounted on the housing;
a controller configured to control the driver moving along the travel path; and
one or more sensors mounted on the housing, and configured to primarily sense the foreign matter sucked through the suctioner under the control of the controller, and to secondarily sense an article collected in the container, if articles other than the foreign matter are sensed.

2. The intelligent robot cleaner of claim 1, wherein the one or more sensors comprises first to third sensors disposed around the suctioner or the container.

3. The intelligent robot cleaner of claim 2, wherein the intelligent robot cleaner further comprises:
a transceiver configured to exchange a signal with a mobile device of a user; and
a display configured to display a state of the intelligent robot cleaner.

4. The intelligent robot cleaner of claim 3, wherein the first sensor is disposed between the suctioner and the container or on an upper portion of the container, and is configured to sense an image of the foreign matter or the article introduced through the suctioner.

5. The intelligent robot cleaner of claim 4, wherein the controller is further configured to: extract a color of the article from the image sensed by the first sensor by comparative analysis with a preset color distribution.

6. The intelligent robot cleaner of claim 5, wherein the controller is further configured to: set a region of interest based on the color of the article extracted from the image to remove unnecessary portions.

7. The intelligent robot cleaner of claim 6, wherein the controller is further configured to: extract characteristics of the article by learning a portion of the article displayed on the region of interest with a neural network, and acquire information about the article by analyzing the characteristics of the extracted article.

8. The intelligent robot cleaner of claim 3, wherein a second sensor is disposed on a lower portion of the container, and is configured to sense a weight or a pressure of the foreign matter or the article collected in the container.

9. The intelligent robot cleaner of claim 8, wherein the controller is further configured to: sense that the article is present in the container when the weight of the container exceeds a preset range, and transmit a notification message to the mobile device registered in the intelligent robot cleaner using the transceiver, or cause a display of the notification message on the display.

10. The intelligent robot cleaner of claim 3, wherein the third sensor is disposed on a circumferential surface of the container or a lower portion of the container, and is configured to sense a sound or a noise generated when the article collides with the container by a pressure of the container.

11. The intelligent robot cleaner of claim 3, wherein the controller is further configured to: sense that the article is present in the container when a sound generated in the container exceeds a preset range, and transmit a notification message to the mobile device registered in the intelligent robot cleaner using the transceiver, or cause a display of the notification message on the display.

12. The intelligent robot cleaner of claim 2, wherein the controller is further configured to: primarily sense the foreign matter sucked through the suctioner using the first sensor, and secondarily sense the article collected in the container using a second sensor or the third sensor, if articles other than the foreign matter are sensed.

13. The intelligent robot cleaner of claim 12, wherein the controller is further configured to: secondarily sense the article collected in the container using the second sensor, and then thirdly sense the article collected in the container using the third sensor.

14. The intelligent robot cleaner of claim 12, wherein the controller is further configured to: learn the primarily sensed article with a neural network, and secondarily sense the article collected in the container by selecting the second sensor or the third sensor based on the learned result.

* * * * *